(No Model.)
W. A. NUTT.
EARTH EXCAVATOR.
No. 253,751. Patented Feb. 14, 1882.
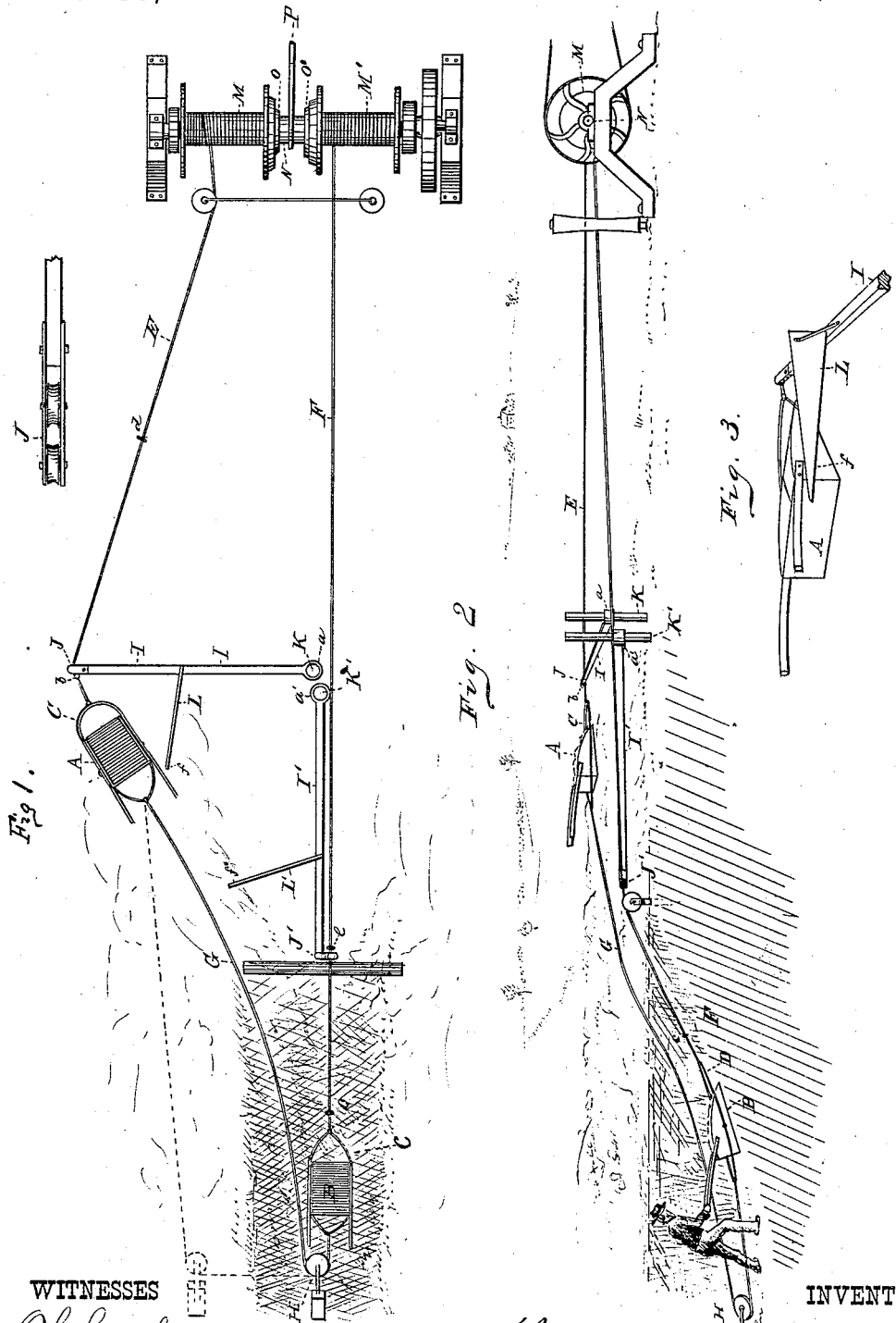
WITNESSES
INVENTOR
W. A. Nutt
By Liggett & Liggett
ATTORNEYS

UNITED STATES PATENT OFFICE.

WILLIAM A. NUTT, OF QUINCY, OHIO.

EARTH-EXCAVATOR.

SPECIFICATION forming part of Letters Patent No. 253,751, dated February 14, 1882.

Application filed December 1, 1881. (No model.)

*To all whom it may concern:*

Be it known that I, WILLIAM A. NUTT, of Quincy, in the county of Logan and State of Ohio, have invented certain new and useful Improvements in Earth-Excavators; and I do hereby declare the following to be a full, clear, and exact description of the invention, such as will enable others skilled in the art to which it pertains to make and use the same.

My invention relates to earth-excavators; and it consists in the peculiar construction of the same, as will be hereinafter fully set forth and claimed.

In the drawings, Figure 1 is a plan view of my device, showing the manner of operating the same. Fig. 2 is a side elevation of the same. Fig. 3 is a detached view, showing one manner of dumping the scraper.

A and B are scrapers, such as are commonly used in excavating, and which are provided with bails C, to which are attached the ropes or chains E and F. To the rear of said scrapers is attached in any suitable manner the rope or chain G, which passes through a pulley-block, H, said pulley being secured by means of a stake, or in any suitable manner, at a short distance in the rear of where it is desired to start the scrapers, and preferably on or about a level with said scrapers when they are at their starting-point.

I and I' are long arms, which are provided at their outer ends with short arms J and J', which are pivotally attached to their respective arms I and I'. These short arms are each provided with suitable pulleys, through which the ropes or chains E and F run and are guided. The inner ends of the arms I and I' are pivoted preferably by means of perpendicular stakes K and K', and band $a$ and $a'$ surrounding the same loosely, and in such a manner as to allow of the vertical movement of the arms I and I'; but the said arms may be pivoted in any suitable manner, so as to allow of the outer ends moving either in a longitudinal or vertical direction, the object of allowing the arms to move in a vertical direction being to facilitate its working on uneven or hilly ground.

The ropes or chains E and F are provided with knots $b\ d$ and $c\ e$, of any suitable construction, which are adapted to engage with the short arms J and J', which causes the arms I and I' to swing out at an angle to the ditch or excavation, said arms in turn pulling with them the scrapers A and B, thus carrying the dirt to one side, where it is dumped at any desired point by any suitable means. One means of dumping the scrapers A and B is shown, which consists of arms L and L', inclined at their outer ends, $f$ and $f'$, and secured to the arms I and I' at an angle, and in such a manner that as the arms I and I' swing around the point of the inclined arms L and L' work under the handle of the scrapers A and B and dump them. These arms L and L' may be adjustably attached to the arms I and I', which will allow of the place of dumping being changed when desired.

My power for operating the scrapers may be of any suitable construction, one manner being shown in the drawings, in which M and M' are two drums, which are allowed to revolve freely around the shaft N. O and O' are two friction-clutches, which are keyed to the shaft N in such a manner that they may slide along the same. These clutches are operated by means of a lever, P, in such a manner as to alternately engage with and be disengaged from the drums M and M', and thus allow one of the drums to revolve freely around the shaft N and pay out the rope, and cause the other to revolve with the shaft N and wind in. Thus it will be seen that as one scraper is drawn in the other will be drawn back.

The operation of my device is as follows: The scraper A is held in such a manner as to cause it to fill with dirt, and the clutch O is caused to engage with the drum M, and the scraper A is started forward and filled, and then continues on up in a straight line until the knot $b$ comes in contact with the short pivoted arm J, which prevents the rope or chain from passing between the pulleys, and as the drum M still continues to revolve the outer end of the arm I is caused to move outward and carries with it the scraper A. When the arm I has reached a point at or about a right angle to the ditch or excavation the point of the inclined arm L works under the handles of the scraper A and causes it to dump. Now, while the scraper A is being drawn forward the scraper B is being drawn back, the knot e coming in contact with the pulleys in the end of the short pivoted arm J' bringing it back to the position shown in Fig. 1. These knots b d and c e may be adjustably attached to the rope or chain, if desired, so as to allow of the changing of the machine, &c. It is obvious that my device may be used for grading, filling in, or any other work where a scraper or similar device is used.

Where the ground is hard a plow or two plows may be attached and operated, if desired.

What I claim is—

1. In an earth-excavator, the combination, with a scraper or similar device, and a rope or chain for operating the same, of a pivoted lever adapted to turn the direction of said scraper, substantially as and for the purpose shown and described.

2. In combination with an earth-excavator, an arm, said arm being pivoted at one end at or near the line of excavation, and adapted to turn the direction of said scraper, substantially as and for the purpose shown and described.

3. In an earth-excavator, the combination of the long arm I and rope or chain E, with its knots b d and c e, substantially as and for the purpose shown and described.

4. In an earth-excavator, the combination, with the long arm I, of arm L, secured to the arm I and adapted to dump the scraper, substantially as set forth.

In testimony whereof I have signed my name to this specification in the presence of two subscribing witnesses.

WILLIAM A. NUTT.

Witnesses:
 HENRY ABELS,
 W. E. DONNELLY.